United States Patent [19]
Leppänen et al.

[11] Patent Number: 5,862,492
[45] Date of Patent: Jan. 19, 1999

[54] MOBILE COMMUNICATION SYSTEM AND A BASE STATION IN A MOBILE COMMUNICATION SYSTEM

[75] Inventors: Reijo Leppänen, Espoo; Mirja Pirinen, Oulu, both of Finland

[73] Assignee: Nokia Telecommunications OY, Espoo, Finland

[21] Appl. No.: 666,321

[22] PCT Filed: Jan. 3, 1995

[86] PCT No.: PCT/FI95/00003

§ 371 Date: Sep. 19, 1996

§ 102(e) Date: Sep. 19, 1996

[87] PCT Pub. No.: WO95/19095

PCT Pub. Date: Jul. 13, 1995

[30] Foreign Application Priority Data

Jan. 4, 1994 [FI] Finland ................................. 940034

[51] Int. Cl.$^6$ ....................................................... H04Q 7/24
[52] U.S. Cl. ........................... 455/560; 455/561; 370/336
[58] Field of Search .................................. 455/422, 560, 455/561, 524, 570; 370/328, 336, 338, 524

[56] References Cited

U.S. PATENT DOCUMENTS

| | | | |
|---|---|---|---|
| 5,337,344 | 8/1994 | Alvesalo | 455/403 |
| 5,388,102 | 2/1995 | Griffith et al. | 370/512 |
| 5,519,702 | 5/1996 | Takahashi | 370/524 |
| 5,579,370 | 11/1996 | Fukushima et al. | 455/440 |

FOREIGN PATENT DOCUMENTS

| | | |
|---|---|---|
| 0 367 007 | 5/1990 | European Pat. Off. . |
| 0 583 137 | 2/1994 | European Pat. Off. . |
| WO 91/10333 | 7/1991 | WIPO . |

OTHER PUBLICATIONS

Patent Abstracts of Japan, vol. 18, No. 113, E–1514, Abstract of JP 5–308673 (A), Nov. 1993.

*Primary Examiner*—Andrew M. Dolinar
*Attorney, Agent, or Firm*—Pillsbury Madison & Sutro LLP

[57] ABSTRACT

A mobile communication system includes base stations, a mobile services switching center, a digital transmission system connecting the base stations to the mobile services switching center, and a network termination of an ISDN base rate access. The digital transmission system has at least one data link connection operating at the rate of the ISDN basic rate access, and digital time division trunk circuits. At least one base station comprises an ISDN basic rate access block for connecting the base station to said data link connection operating at the rate of the ISDN basic rate access. The digital transmission system comprises a switching means positioned between the base station and the mobile services switching center for connecting said ISDN basic rate access block of the base station through the data link connection operating at the rate of the ISDN basic rate access to a digital trunk circuit. The mobile communication system comprises a base station controller between the mobile services switching center and the switching means of the fixed network for controlling the base station. The switching means is arranged to connect said ISDN basic rate access block of the base station through the data link connection operating at the rate of the ISDN basic rate access to the time division trunk circuit leading to the base station controller.

12 Claims, 2 Drawing Sheets

MOBILE COMMUNICATION SYSTEM AND A BASE STATION IN A MOBILE COMMUNICATION SYSTEM

This application claims benefit of international application PCT/FI95/00003 filed Jan. 3, 1995.

FIELD OF THE INVENTION

The invention relates to a mobile communication system comprising base stations, a mobile services switching center, a digital transmission system connecting the base stations to the mobile services switching center, and a network termination of an ISDN basic rate access.

BACKGROUND OF THE INVENTION

In mobile communication or mobile telephone networks of the prior art, a base station (BTS) of the network is connected to a base station controller (BSC) either by the use of a digital data link connection of 2048 kbit/s, with altogether 32 time slots of 64 kbit/s, or only some of those time slots.

The problem with the solutions of the prior art has been the high expenses: for a base station, it is necessary to allocate either an entire data link connection of 2048 kbit/s, typically a cable or radio link connection, or several connections, e.g. n separate connection of 64 kbit/s.

The drawback of fixed connections of 2048 kbit/s is that the transmission capacity offered by such a connection is often too high, i.e. part of the transmission capacity remains unused. For most base stations, about 100 to 500 kbit/s would be sufficient. The systems of the prior art are thus inflexible as regards the allocation of transmission capacity, since it is not possible to select only the required, smaller transmission capacity for use.

The drawback with the use of n separate connections of 64 kbit/s is that the base stations have not been designed for such a data transmission rate. The transmission of a bit stream from the base station to the data link connection is therefore not easy.

SUMMARY OF THE INVENTION

The object of the present invention is to solve the problem described above, i.e. how a transmission channel of 64 kbit/s on an ISDN data link connection is divided between the channels of 8, 16 or 32 kbit/s used by the base station. Thus the invention also solves the problem caused by the fact that previously it has not been possible to connect base stations to ISDN data link connections except by a connection of 2048 kbit/s or n connections of 64 kbit/s.

This new type of mobile communication system and base station of a mobile communication system are achieved with the mobile communication system according to the invention, which is characterized in that the digital transmission system comprises at least one data link connection operating at the rate of the ISDN basic rate access, and digital time division trunk circuits, at least one base station comprises an ISDN basic rate access block for connecting the base station to said data link connection operating at the rate of the ISDN basic rate access, and that the digital transmission system comprises a switching means positioned between the base station and the mobile services switching center for connecting said ISDN basic rate access block of the base station through the data link connection operating at the rate of the ISDN basic rate access to a digital trunk circuit.

The invention further relates to a base station of a mobile communication system comprising a transceiver unit and a multiplexing unit. The base station of the invention is characterized in that it comprises an ISDN basic rate access block for connecting and adapting the base station to a data link connection located between the base station and the mobile services switching center or the base station controller and operating at the rate of the ISDN basic rate access.

The invention is based on the idea that the base station comprises an interface unit, i.e. an ISDN basic rate access block, by means of which the base station is connected to a data link connection operating at the rate of the ISDN basic rate access. This makes it possible to provide a switching means between the base station and the mobile services switching center or the base station controller, said switching means switching the ISDN basic rate access, i.e. a channel of 2×64 kbit/s+16 kbit/s or a necessary number of these channels. The ISDN basic rate access is a means through which a terminal equipment can communicate both with a conventional network and with an ISDN telecommunication network, and via them also with other public telecommunication networks; in the telecommunication channel, data is transmitted as digital characters at least from the ISDN basic rate access to the switching means of the ISDN network, possibly even further. The character rate of the ISDN basic rate access is defined in such a way that it comprises two traffic channels of 64 kbit/s, and one signalling channel of 16 kbit/s, used primarily for establishing and monitoring a telecommunication connection. The switching of the ISDN basic rate access can be either fixed or selective so that the base station is always allocated the amount of transmission capacity it needs. An ISDN exchange or an ISDN switching means is a device which renders it possible to offer the ISDN basic rate access to the users of the ISDN network.

The advantage of such a mobile communication system and a base station for a mobile communication system is that the solve the problems associated with the solutions of the prior art. The invention thus enables an ISDN basic rate access to be used as a telecommunication resource of a base station in a mobile communication system. To connect a base station to the mobile services switching center by means of an ISDN basic rate access is advantageous in areas comprising a local ISDN exchange.

A further advantage of the mobile communication system according to the invention is that the invention allows the connection between the base station and the mobile services switching center to be released when there are no calls. In this way even more data transmission capacity is saved between the base station and the mobile switching center.

BRIEF DESCRIPTION OF THE DRAWINGS

In the following, the invention will be described in greater detail with reference to the accompanying drawings, in which.

DETAILED DESCRIPTION OF THE PRESENTLY PREFERRED EXEMPLARY EMBODIMENTS

Figure 1:
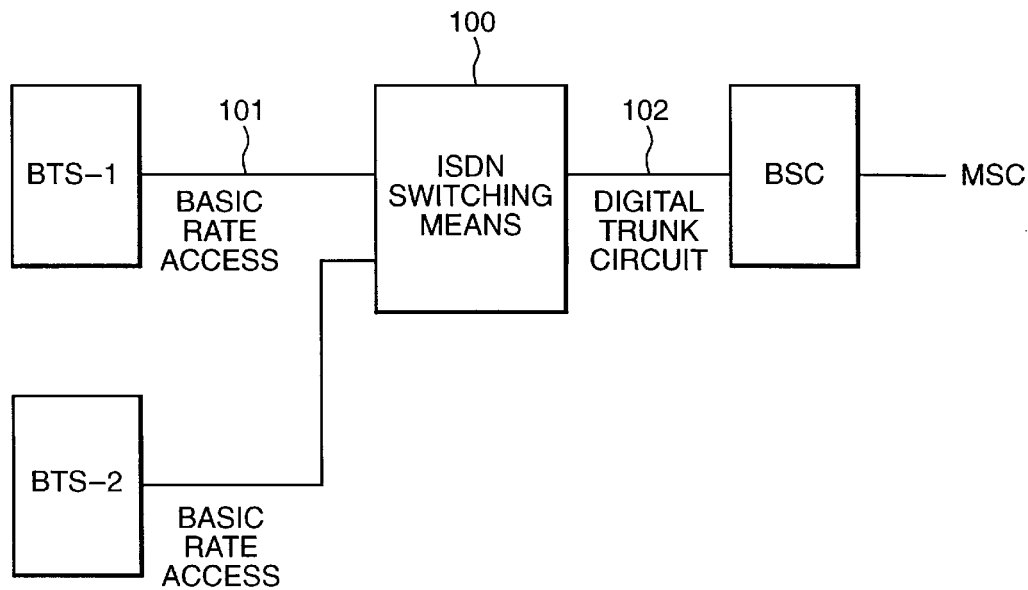
FIG. 1 is a block diagram of a mobile communication system according to the invention.

FIG. 1 is a block diagram of a mobile communication system according to the invention. The figure shows base stations BTS-1 and BTS-2 according to the invention in a mobile communication system. These base stations are connected to a switching means 100, which may be an ISDN switching means, such as an ISDN exchange of a fixed network as in FIG. 1, or a cross-connection device. A cross-connection device is a device to which digital data link connections are connected as subscriber connections. The switching means 100 may consist of the basic rate access multiplexer of the ISDN exchange of a fixed network and the ISDN exchange of a fixed network. The digital data link connections comprise a data link connection 101 operating at the rate of the ISDN basic rate access, and a digital trunk circuit 102. The digital trunk circuit 102 is a time division trunk circuit where one or more signalling channels are transmitted. The trunk circuit thus has a bit rate of 2048 kbit/s or 1544 kbit/s. The cross-connection device 100 may switch connections semipermanently (by commands given by the operator controlling the device or by a computer) between different subscriber connections. In this embodiment, the cross-connection device switches a connection from the base station to a base station controller BSC or a mobile services switching center MSC: the cross-connection device required thus at least one bidirectional link having a rate which is a multiple of 64 kbit/s. In the system according to the invention, the ISDN switching means is positioned between the base stations and the base station controller or the mobile services switching center so that the base stations can utilize the ISDN data link connections.

Figure 2:
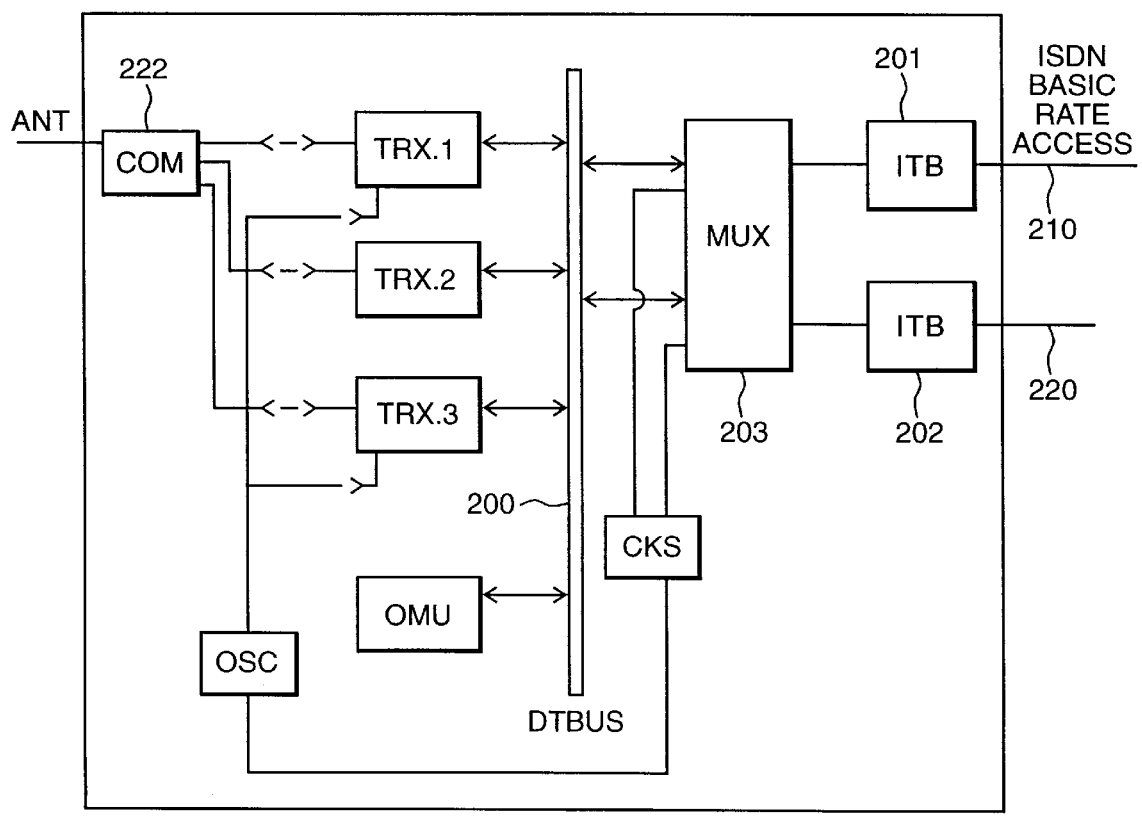
FIG. 2 is a block diagram of a base station according to the invention in a mobile communication system.

FIG. 2 is a block diagram of a base station according to the invention in a mobile communication system. The base station comprises several transceiver units TRX.1–TRX.3 and an operation and maintenance unit OMU. These units are connected through a bus 200 DTBUS to an ISDN basic rate access multiplexer 203 MUX. The ISDN basic rate access multiplexer is a device that combines signals supplied from several ISDN basic rate accesses (correspondingly also signals from the opposite transmission direction) and supplies them to a trunk circuit wherefrom they are further switched to the ISDN exchange by means of an interface corresponding either to the ISDN basic rate access or to the ISDN primary rate access. By the use of a basic rate access multiplexer, it is possible to save expenses, since it is not necessary to construct a long pair of conductors for each ISDN access. The multiplexer 203 is connected to the ISDN access blocks 201, 202, ITB, which are interface units for connecting the base station—particularly its multiplexer MUX—to the data link connections 210, 220, operating at the rate of the ISDN basic rate access. The bus DTBUS 200 is a digital time division bus, the rate of which can be, for example, 2048 kbit/s. In addition to its other functions, the operation and maintenance unit OMU monitors and controls the operation of the ISDN basic rate access blocks 201, 202.

FIG. 2 is a block diagram of a base station according to the invention in a mobile communication system. The base station according to the invention is characterized in that it comprises units by which the ISDN basic rate access is implemented, i.e. ISDN basic rate access block 201, 203, ITB. The ISDN basic rate access block may be an S- or U-interface unit. The base station according to the invention can maintain the connection between the base station and the ISDN exchange either continuously or only when necessary. If the system comprises a base station controller BSC, its ISDN basic rate access block can serve as an ISDN primary rate access (2048 kbit/s) or as an ISDN basic rate access (144 kbit/s). The two channels of 64 kbit/s in the ISDN basic rate access are divided into subchannels of 32 kbit/s, 16 kbit/s or 8 kbit/s to be used for traffic, signalling, and operation and maintenance, in a selected allocation of bits.

In FIG. 2, the transmitter units TRX.1–3 of the base station transmit their signals through a signal adder COM 222 to an antenna ANT for further transmission to the radio path. The transceiver units TRX.1–3 receive signals transmitted by mobile telephones. The information to be transmitted is encoded in an encoding unit, which encodes the signal supplied to the transmitter into a so-called TRAU frame form. The signal in the form of TRAU frames received by the base station from the mobile telephone is decoded in a decoding unit, from which it is transmitted to a bus DTBUS 200. All transceiver units TRX.1–3 and the ISDN basic rate access multiplexer MUX 203 are timed by an oscillator and timing unit OSC. Between them, there is a clock selection unit CKS. The oscillator unit can be phase locked to a timing signal received from the S- or U-interface unit 201, 202; the clock selection unit CKS selects the control signal from an S- or U-interface unit ITB, or it does not select any control signal. Both the information received by the base station and decoded by the decoder and the information fed to the encoder for transmission are delivered to the encoder and from the decoder through the bus 200. Decoded information is supplied to the multiplexer MUX. Correspondingly, the information to be encoded and transmitted is read from the multiplexer MUX to the bus 200. The multiplexer MUX is a device which adapts the buses DTBUS for the basic rate access block ITB. If the OMU is not connected directly to the bus DTBUS, it may be connected to the MUX block, which supplies the signal of the OMU towards the ITB and correspondingly in the opposite direction. If the signal of the DTBUS is directly suitable for the ITB, and the OMU is connected to the bus DTBUS, the multiplexer can be left unused. The multiplexed signals are applied to the ISDN basic rate access blocks 201, 202, ITB, which convert them into a form compatible with the ISDN basic rate access, and correspondingly convert the signals from the ISDN basic rate access into a form compatible with the base station. The ISDN basic rate access block 201, 202, ITB is an interface unit according to the ISDN S- or U-interface recommendation. The S-interface unit converts an S-interface signal, transmitted in differential form and detected between the conductors as offset voltage, into a signal form compatible with the base station. Correspondingly, the U-interface unit converts a U-interface signal. The line code used in the S-interface is pseudotertiary, i.e. bit "0" is transmitted alternately as a+ and a− pulse, and bit "1" is transmitted by sending no signal pulse.

Figure 3:
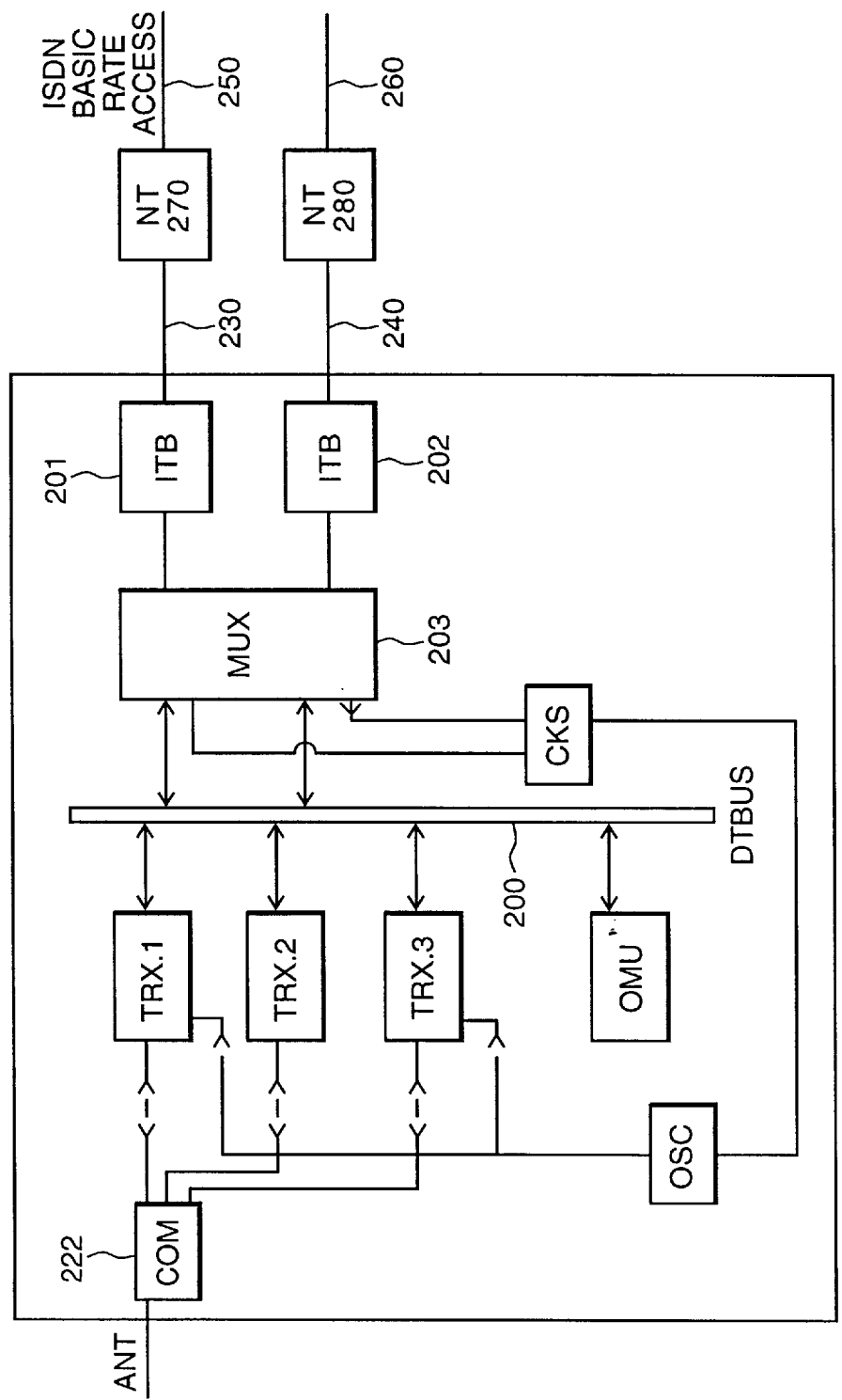
FIG. 3 is a block diagram of a base station according to the invention in a mobile communication system, and ISDN network terminations.

FIG. 3 is a block diagram of a base station according to the invention in a mobile communication system, and ISDN network terminations NT. In its essential parts, the base station shown in the figure corresponds to the one illustrated in FIG. 2. The base station illustrated in the figure— particularly its ISDN basic rate access block 201, 202 ITB- is implemented as an S-interface block. The S-interface block transmits signals 230, 240 which carry the signals transmitted to the ISDN network termination in differential form in the uplink direction. The network termination NT also comprises an S-interface unit, which forwards the signals to a U-interface unit, which supplies them further in a pair of conductors 250, 260.

The drawings and the description relating to them are intended merely to illustrate the idea of the invention. In their details, the mobile communication system according to the invention and the base station of a mobile communication system can vary within the scope of the claims.

Although the invention has been described above mainly in connection with mobile communication systems, it may also be used in other types of radio telephone systems.

We claim:

1. A mobile communication system comprising:

base stations a mobile services switching center, a digital transmission system connecting the base stations to the mobile services switching center, and a network termination of an ISDN base rate access, wherein the digital transmission system comprises at least one data link connection operating at the rate of the ISDN basic rate access, and digital time division trunk circuits, at least one base station comprises an ISDN basic rate access block for connecting the base station to said data link connection operating at the rate of the ISDN basic rate access, the digital transmission system comprises a switching means positioned between the base station and the mobile services switching center for connecting said ISDN basic rate access block of the base station through the data link connection operating at the rate of the ISDN basic rate access to a digital trunk circuit, the mobile communication system comprises a base station controller between the mobile services switching center and the switching means of the fixed network for controlling the base station, and the switching means is arranged to connect said ISDN basic rate access block of the base station through the data link connection operating at the rate of the ISDN basic rate access to the time division trunk circuit leading to the base station controller.

2. A mobile communication system according to claim 1, wherein said switching means is an ISDN exchange of a fixed network.

3. A mobile communication system according to claim 2, wherein said switching means consists of the basic rate access multiplexer of the ISDN exchange of the fixed network and the ISDN exchange of the fixed network.

4. A mobile communication system according to claim 1, wherein said switching means is a cross-connection device.

5. A mobile communication system according to claim 1, wherein said switching means is arranged to connect said data link connection coming from the base station to the digital trunk circuit leading to the mobile services switching center.

6. A mobile communication system according to claim 1, wherein said digital trunk circuit is a time division trunk circuit in which one or more traffic channels, and one or more signaling channels are transmitted, the trunk circuit having a bit rate of 2048 kbit/s or 1544 kbit/s.

7. A base station of a mobile communication system, comprising:

a transceiver unit, a multiplexing unit, an ISDN basic rate access block for connecting the base station to and adapting it for a data link connection located between the base station and a mobile services switching center or a base station controller and operating at the rate of the ISDN basic rate access, wherein said ISDN basic rate access block communicates with the ISDN data link connection by means of a pair of conductors, in which the signal is transferred bidirectionally by means of echo cancellation.

8. A base station according to claim 7, characterized in that said ISDN basic rate access block is an interface unit according to the ISDN S-interface or U-interface recommendation.

9. A base station according to claim 8, characterized in that said ISDN basic rate access block adapts connections from within the base station for an S-interface or a U-interface.

10. A base station according to claim 7, wherein said ISDN basic rate access block communicates with the ISDN data link connection by means of differential currents.

11. A base station according any one of claim 7, wherein all signal transmitted by the base station to the ISDN data link connection and received therefrom are positioned in two channels of 64 kbit/s in the ISDN basic rate access.

12. A base station according to claim 7, two channels of 64 kbit/s in the ISDN basic rate access are divided into subchannels of 32 kbit/s, 16 kbit/s or 8 kbit/s to be used for traffic, signaling, and operation and maintenance, in a selected allocation of bits.

* * * * *